United States Patent [19]

Takahashi

[11] Patent Number: 5,325,512

[45] Date of Patent: Jun. 28, 1994

[54] CIRCUIT EMULATOR

[75] Inventor: Hiromichi Takahashi, Tokyo, Japan

[73] Assignee: NEC Corporation, Tokyo, Japan

[21] Appl. No.: 90,333

[22] Filed: Jul. 12, 1993

[30] Foreign Application Priority Data

Jul. 22, 1992 [JP] Japan .................................. 4-194425

[51] Int. Cl.$^5$ ...................... G06F 9/312; G06F 9/455; G06F 13/34
[52] U.S. Cl. .................... 395/500; 371/16.2; 371/19; 364/232.3; 364/DIG. 1
[58] Field of Search .................. 395/500; 371/19, 16.2

[56] References Cited

U.S. PATENT DOCUMENTS

| | | | |
|---|---|---|---|
| 4,788,683 | 11/1988 | Hester et al. | 371/16.1 |
| 4,924,382 | 5/1990 | Shouda | 395/700 |
| 4,939,637 | 7/1990 | Pawloski | 395/800 |
| 4,998,197 | 3/1991 | Kurakazu et al. | 395/800 |
| 5,056,013 | 10/1991 | Yamamoto | 371/19 |
| 5,161,229 | 11/1992 | Yasui et al. | 395/775 |

Primary Examiner—Parshotam S. Lall
Assistant Examiner—Timothy L. Philipp
Attorney, Agent, or Firm—Whitham, Curtis & Whitham

[57] ABSTRACT

An In Circuit Emulator includes first and second memories, a emulation chip, gate circuit, and an input circuit. The first memory stores a program to be executed by a target system. The second memory stores a program for controlling the emulation chip. The emulation chip emulates the target system, and includes: a first latch for latching an externally supplied supervisor interrupt request signal; a second latch for latching a macro service request; and a sequencer for selectively accessing the first and second memories in response to the supervisor interrupt request signal and the macro service request to execute a corresponding program, the sequencer executing the macro service request independent of the supervisor interrupt request signal latched in the first latch. The gate circuit outputs control signals for controlling access to the first and second memories. The input circuit directly inputs the macro service request latched in the second latch.

3 Claims, 3 Drawing Sheets

CIRCUIT EMULATOR

BACKGROUND OF THE INVENTION

1. Field of the Invention

The present invention relates to an In Circuit Emulator for a single-chip microcomputer.

2. Related Art

An In Circuit Emulator (hereinafter referred to as an ICE) is one known microcomputer development aiding apparatus. An ICE is a system which incorporates a computer system or a microcomputer which is being developed and cannot develop a software by itself, and is used to debug the software. More specifically, a processor chip of a target computer is detached and a probe of the ICE is attached thereto to emulate operations of a processor or a memory. In other words, in accordance with instructions from the ICE or via a communication line, various functions are performed to develop an arbitrary interruption, the setting of a break point, execution of a single step, display and change of contents of registers and a memory, and execution trace in a system. Such In Circuit Emulator is described in "IE-78600-R In Circuit Emulator hardware manual" published from Nippon Electric Company LTD. in March, 1993, for example.

FIG. 1 is a block diagram showing an emulation board and its periphery which constitute main parts of the driver module block diagram of the ICE disclosed in the above described manual. In FIG. 1, the ICE 300 is connected to a supervisor 351, a main memory 352, and an input and output (I/O) unit 354 through a system bus 353. The ICE 300 may be connected to the supervisor 351 through a communication line. The main memory 352 stores a debug program. The debug program includes functions such as arbitrary interruption of a user program (a program executed by a target device), setting of a break point, execution of a single step, display and change of contents of registers and the memory, and execution trace. The supervisor 351 executes the program stored in the main memory 352, outputs a supervisor interrupt request signal (SVIRQ) 312 to an emulation chip 301, as necessity requires, to instruct the chip 301 what to do.

The ICE 300 comprises an emulation chip 301, an emulation memory 302, an alternate memory 303, an internal bus 304, a composite gate 305, an AND gate 306, an OR gate 307, an inverter 308, and other peripheral circuits (not shown) necessary for performing emulation. The emulation chip 301 comprises a sequencer 309, a flip-flop (F/F) 310 for setting a supervisor flag, a flip-flop (F/F) 322 for setting a macro service request flag 322, and an AND gate 323. The sequencer 309 has an arrangement (a CPU, a ROM, a RAM, and a DMA controller, and the like) and functions similar to that of a target device such as a microcomputer. The sequencer 309 has additional functions such as generation of various control signals necessary for emulation. Specifically, the sequencer 309 generates a SVMOD signal 313, a FETCH signal 314, a SR/W signal 315, a MR/W signal 316, a MSR/W signal 317, a RETSVI signal 320, and a macro service clear signal 322. The SVMOD signal 313 is a signal indicating the supervisor mode, while the FETCH signal 314 indicates fetching of an instruction of a user program stored in an emulation memory 302 (to be described later) in non-supervisor mode (a normal mode), and an instruction of a program stored in an alternate memory 303 in the supervisor mode. The NR/W signal 316 indicates reading/writing of data in the emulation memory 302 in the non-supervisor mode, and reading/writing of data in the alternate memory 303 in the supervisor mode. The SR/W signal 315 is a signal indicating reading/writing from/into the emulation memory 302 in the supervisor mode, while the MSR/W signal 317 is a signal indicating reading/writing from/into the emulation memory 302 when the sequencer 309 is performing a macro service (in the non-supervisor mode). The RETSVI signal 320 is a signal for resetting the supervisor flag (F/F 310), while the macro service clear signal 322 is a signal for resetting a macro service request flag (F/F 311). The AND gate 323 is a gate for blocking the macro service request signal when the SVMOD signal 311 is at logic "1".

The emulation memory 302 stores a user program (a program executed by a target device), and the alternate memory 303 stores a program controlling the emulation chip 301, e.g., a control program for outputting the contents of registers included in the sequencer 309.

The composite gate 305 blocks the FETCH signal 314 and the NR/W signal 316 when the above-described SVMOD signal 313 is active (logic "1"). The AND gate 306 passes the SR/W signal 315 when the SVMOD signal 313 is active (logic "1"), the OR gate 307 receives the output signals of the AND gates 305 and 306 and the MSR/W signal 317, and outputs the chip enable signal to the emulation memory 302 or the alternate memory 303. More specifically, when the output of the OR gate 307 is at logic "1", the active EMEMR/W signal 318 is supplied to the emulation memory 302, and the inactive ALTR/W signal 319, which is inverted by an inverter 308, is supplied to the alternate memory 303. When the output of the OR gate 307 is at logic "0", the active ALTR/W signal 319 is supplied to the alternate memory 303, and the active EMEMR/W signal 319 is supplied to the emulation memory 302.

The sequencer 309 generates the above-described various signals in response to instructions from the supervisor to access the alternate memory 303 or the emulation memory 302, execute the control program stored in the alternate memory 303, output status data in the emulation chip 301 and the contents of various registers, or perform execution trace of the user program stored in the emulation memory 302.

An operation of a conventional in circuit emulator constructed as above will now be described.

First, a reset signal (RESET) from the supervisor 315 is supplied to the emulation chip 301 to reset the same. Then, the supervisor 351 supplies the active SVIRQ signal 312 to the emulation chip 301 to set the supervisor flag. As a result, the SVMOD signal 313 of logic "1" is output from the Q output terminal of the F/F 310 to set the emulation chip 301 in the supervisor mode. Then, the supervisor 351 makes the RESET signal inactive to clear the reset of the emulation chip 301.

The sequencer 309 polls the supervisor flag 310 to determine whether or not an interrupt has been generated by the supervisor 351. If an interrupt has been generated by the supervisor 351, the sequencer 309 executes the supervisor interrupt routine in the alternate memory 303. When the program in the alternate memory 303 is fetched, the sequencer 309 outputs the active (logic "1") FETCH signal 314, with the result that output of the composite gate 305 becomes logic "1". Further, the output of the OR gate 307, —i.e., the EMEMR/W signal 318—becomes logic "0", and the output of the inverter 308, —i.e., the ALTR/W signal 319—becomes logic "1". As a result, the sequencer 309 fetches the instruction in the alternate memory 303.

When the data in the alternate memory 303 is accessed, the sequencer 309 outputs the active (logic "1") NR/W signal 316, with the result that the output of the composite gate 305 becomes logic "0". Further, the output of the OR gate 307—the EMEMR/W signal 318—becomes logic "0", and the output of the inverter 308—i.e., the ALTR/W signal 319—becomes logic "1". As a result, the sequencer 309 reads data from or writes data into the alternate memory 303.

When a special instruction (an emulation memory access instruction) in the control program stored in the alternate memory 303 is executed, the sequencer 309 outputs the active (logic "1") SR/W signal 315, with the result that the output of the AND gate 306 becomes logic "1". Further, the output of the OR gate 307—i.e., the EMEMR/W signal 318—becomes logic "1", and the output of the inverter 308—i.e., the ALTR/W signal 319—becomes logic "0". As a result, the sequencer 309 accesses the emulation memory 302 even in the supervisor mode, in response to the special instruction.

When a macro service request is generated in the supervisor mode, i.e., when the sequencer 309 encounters a macro call instruction during accessing the emulation memory 302 in the supervisor mode, it sets the macro service flag 311. However, since the SVMOD signal 313 is logic "1", the output of the AND gate 323 is logic "0", and therefore the macro service is not executed.

An operation which takes place when the sequencer 309 executes the user program in the emulation memory 302 in the non-supervisor (normal) mode will now be described.

Upon executing a return (RET) instruction in a supervisor interrupt routine, the sequencer 309 outputs the RETSVI signal 320 to reset the supervisor flag 310. As a result, the SVMOD signal 313 becomes logic "0", and the supervisor mode of the emulation chip 301 is cleared.

When the program in the emulation memory 302 is fetched, the sequencer 309 outputs the active (logic "1") FETCH signal. As a result, the output of the composite gate 305 becomes logic "1" and the output of the inverter 308—i.e., the ALTR/W signal 319—becomes logic "0". Accordingly, the sequencer 309 fetches the instruction in the user program in the emulation memory 302.

When data is read from or written into the emulation memory 302, the sequencer 309 outputs the active (logic "1") NR/W signal 316. As a result, the output of the composite gate 305 becomes logic "1". Further, the output of the OR gate—i.e., the EMEMR/W signal 318—becomes logic "1", and the output of the inverter 308—i.e., the ALTR/W signal 319—becomes logic "0". Accordingly, the sequencer 309 reads data from or writes data into the emulation memory 303.

When the macro service request is generated, the sequencer 309 sets the macro service flag to logic "1". As a result, the output of the AND gate 312 becomes logic "1" since the SVMOD signal 313 is logic "0". Therefore, the sequencer 309 executes the macro service. More specifically, the sequencer 309 outputs the active (logic "1") MSR/W signal 317, with the result that the output of the OR gate 307—i.e., the EMEMR/W signal 318—becomes logic "1". Accordingly, the sequencer 309 accesses the macro library stored in the emulation memory 302 to perform a macro development.

Conventionally, in a system comprising a CPU, a DMA controller, and peripheral chips, the DMA controller can be operated even in the supervisor mode by using a memory-I/O demand release mode. However, since in the conventional emulation chip, the supervisor interrupt has the highest priority, execution of the macro service is therefore delayed when the emulation chip is set in the supervisor mode. For this reason, the DMA controller does not operate in the memory-I/O demand release mode, resulting in low-speed processing.

SUMMARY OF THE INVENTION

An object of the present invention is to provide an in circuit emulator in which the emulation chip can execute the macro service even in the supervisor mode, thereby to improve the processing speed.

In order to achieve the above object, according to the present invention, an in circuit emulator comprises a first memory for storing a program to be executed by a target system; a second memory for storing a program for controlling an emulation chip; an emulation chip for emulating the target system, including: a first latch for latching an externally supplied supervisor interrupt request signal; a second latch for latching the macro service request; and a sequencer for selectively accessing the first and second memories in response to the supervisor interrupt request signal and the macro service request to execute the corresponding program, the sequencer executing the macro service request independent of the supervisor interrupt request signal latched in the first latch; gate means for outputting control signals for controlling access to the first and second memories; and means for directly inputting the macro service request latched in the second latch.

According to the present invention, when a macro service request is generated when the emulation chip is set in the supervisor mode, the request is supplied to the sequencer 309. Accordingly, the DMA controller can be operated by the memory-I/O demand release mode. Accordingly, a high-speed operation can be achieved.

DETAILED DESCRIPTION OF THE PREFERRED EMBODIMENTS

Figure 1:
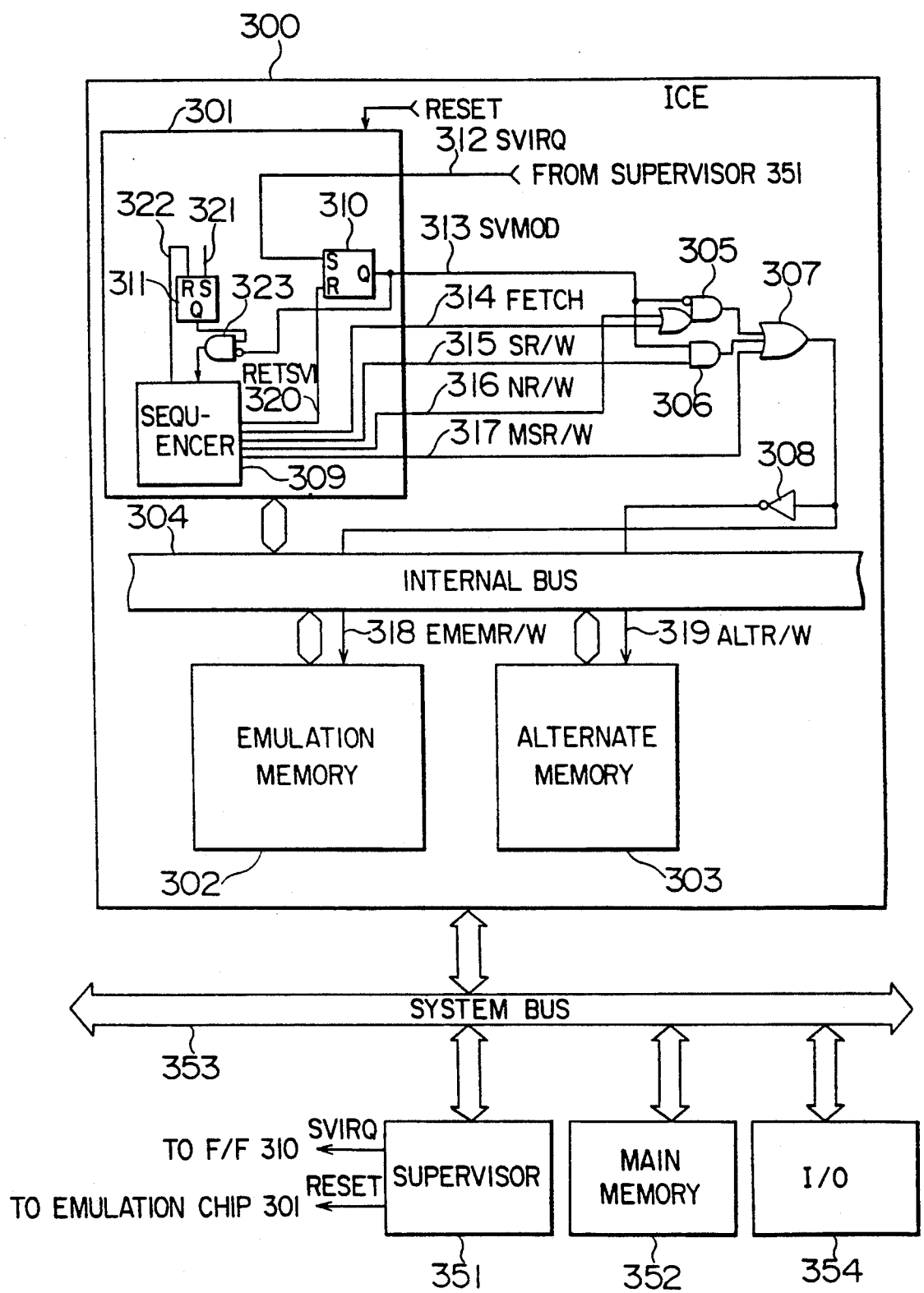
FIG. 1 is a block diagram showing a conventional in circuit emulator.
Figure 2:
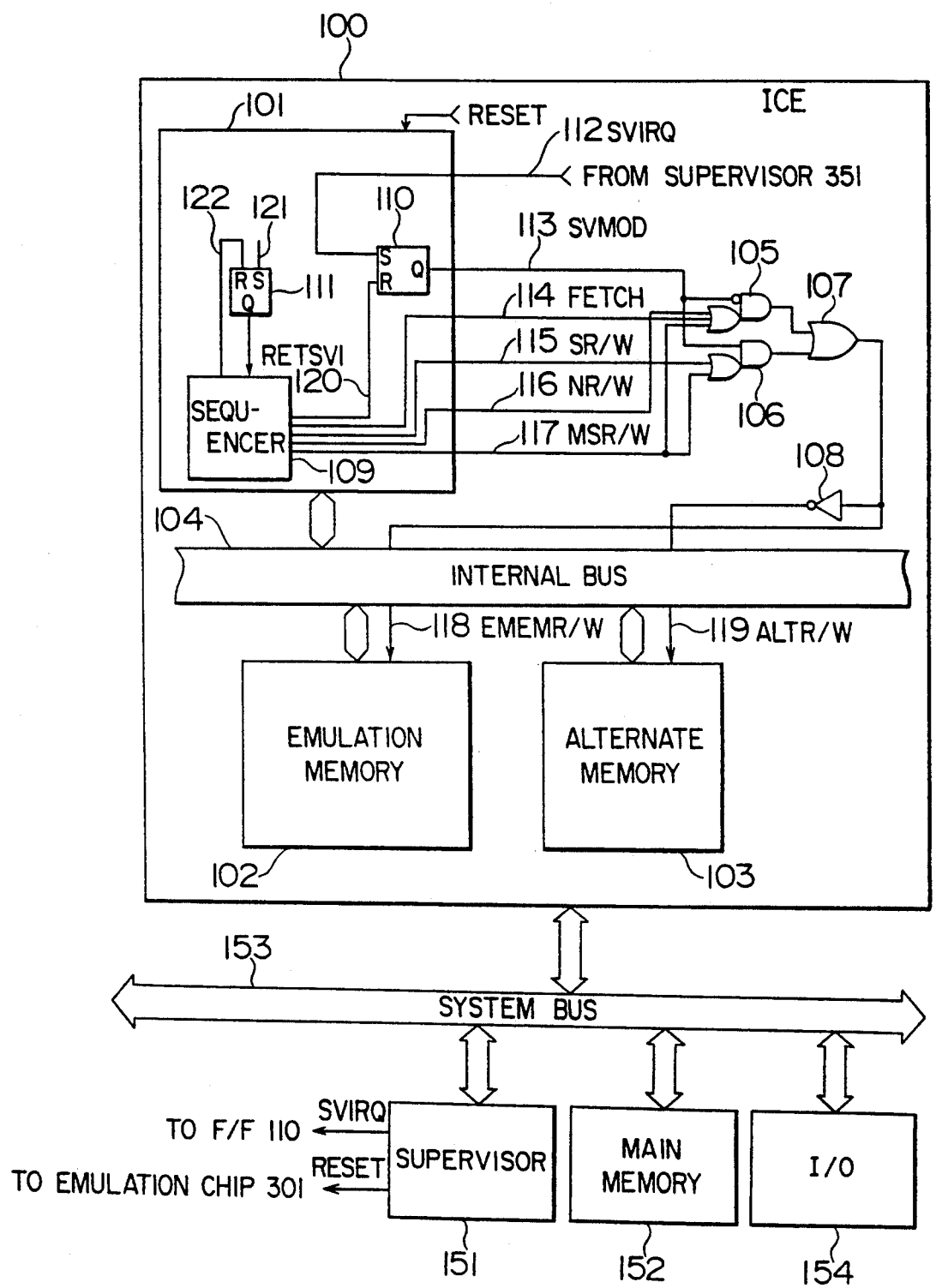
FIG. 2 is a block diagram showing an embodiment of an in circuit emulator according to the present invention.

FIG. 2 is a block diagram showing an embodiment of an in circuit emulator according to the present invention. An ICE 100 is connected to a supervisor 151, a main memory 152, and I/O unit 154 through a system bus 153. The ICE 100 may alternatively be connected to the supervisor 151 through a communication line. The main memory 152 stores a debug program, includes functions such as arbitrary interrupting of a user program (a program executed by a target device), setting of a break point, execution of a single step, display and changing of contents of registers and the memory, and an execution trace. The supervisor 151 executes the program stored in the main memory 152, outputs a supervisor interrupt request signal (SVIRQ) 112 to an emulation chip 301, as necessity requires, to instruct the chip 101 what to do.

The ICE 100 comprises an emulation chip 101, an emulation memory 102, an alternate memory 103, an internal bus 104, a composite gates 105 and 106, an OR gate 107, an inverter 108, and other peripheral circuits (not shown) necessary for the emulation. The emulation chip 101 comprises a sequencer 109, a flip-flop (F/F) 110 for setting a supervisor flag, and a flip-flop (F/F) 111 for setting a macro service request flag. The sequencer 109 has an arrangement (a CPU, a ROM, a RAM, and a DMA controller and the like) and function similar to that of a target device such as a microcomputer. Further, the sequencer 109 has additional functions, such as generation of various control signals necessary for the emulation. Specifically, the sequencer 109 generates a SVMOD signal 113, a FETCH signal 114, a SR/W signal 115, a MR/W signal 116, a MSR/W signal 117, a RETSVI signal 120, and a macro service clear signal 122. The SVMOD signal 113 is a signal indicating the supervisor mode, while the FETCH signal 114 indicates fetching of an instruction of a user program stored in an emulation memory 102 (to be described later) in non-supervisor mode (a normal mode), and an instruction of a program stored in an alternate memory 103 in the supervisor mode. The NR/W signal 116 indicates reading/writing of data in the emulation memory 102 in the non-supervisor mode, and reading/writing of data in the alternate memory 103 in the supervisor mode. The SR/W signal 115 is a signal indicating reading/writing from/into the emulation memory 102 in the supervisor mode, while the MSR/W signal 117 is a signal indicating reading/writing from/into the emulation memory 102 when the sequencer 109 is executing a macro service (in the non-supervisor mode). The RETSVI signal 120 is a signal for resetting the supervisor flag (F/F 110), while the macro service clear signal 122 is a signal for resetting a macro service request flag (F/F 111).

The emulation memory 102 stores a user program (a program executed by a target device), and the alternate memory 103 stores a program controlling the emulation chip 101—e.g., a control program for outputting the contents of various registers included in the sequencer 109.

The composite gate 105 blocks the FETCH signal 114, the NR/W signal 116, and the MSR/W signal 117 when the above-described SVMOD signal 113 is active (logic "1"). The OR gate 107 receives the output signals of the composite gates 105 and 106, and outputs the chip enable signal to the emulation memory 102 or the alternate memory 103. More specifically, when the output of the OR gate 107 is at logic "1", the active EMEMR/W signal 118 is supplied to the emulation memory 102, and the inactive ALTR/W signal 119, which is inverted by an inverter 108, is supplied to the alternate memory 103. When the output of the OR gate 107 is at logic "0", the active ALTR/W signal 119 is supplied to the alternate memory 103, and the active EMEMR/W signal 119 is supplied to the emulation memory 102.

The sequencer 109 generates the above-described various signals in response to instructions from the supervisor to access the alternate memory 103 or the emulation memory 102, execute the control program stored in the alternate memory 103, outputs status data in the emulation chip 101 and contents of various registers, or perform execution trace of the user program stored in the emulation memory 102.

An operation of an in circuit emulator of the present invention constructed as above will now be described.

First, a reset signal (RESET) from the supervisor 151 is supplied to the emulation chip 101 to reset the same. Then, the supervisor 151 supplies the active SVIRQ signal 112 to the emulation chip 101 to set the supervisor flag. As a result, the SVMOD signal 113 of logic "1" is output from the Q output terminal of the F/F 110 to set the emulation chip 101 in the supervisor mode. Then, the supervisor 151 makes the RESET signal inactive to clear the reset of the emulation chip 101.

The sequencer 109 polls the supervisor flag 110 to determine whether or not an interrupt has been generated by the supervisor 151. If an interrupt has been generated by the supervisor 151, the sequencer 109 executes the supervisor interrupt routine in the alternate memory 103. When the program in the alternate memory 103 is fetched, the sequencer 109 outputs the active (logic "1") FETCH signal 114, with the result that the output of the composite gate 105 becomes logic "0". Further, the output of the OR gate 107—i.e., the EMEMR/W signal 118—becomes logic "0", and the output of the inverter 108—i.e., the ALTR/W signal 119—becomes logic "1". As a result, the sequencer 109 fetches the instruction in the alternate memory 103.

When the data in the alternate memory 103 is accessed, the sequencer 109 outputs the active (logic "1") NR/W signal 116, with the result that the output of the composite gate 105 becomes logic "0." Further, the output of the OR gate 107—i.e., the EMEMR/W signal 118—becomes logic "0", and the output of the inverter 108—i.e., the ALTR/W signal 118—becomes logic "1". As a result, the sequencer 109 reads data from or writes data into the alternate memory 103.

When a special instruction (an emulation memory access instruction) in the control program stored in the alternate memory 103 is executed, the sequencer 109 outputs the active (logic "1") SR/W signal 115, with the result that the output of the composite gate 106 becomes logic "1." Further, the output of the OR gate 107—i.e., the EMEMR/W signal 118—becomes logic "1", and the output of the inverter 108—i.e., the ALTR/W signal 119—becomes logic "0". As a result, the sequencer 109 accesses the emulation memory 102, even in the supervisor mode, in response to the special instruction.

When a macro service request is generated in the supervisor mode, i.e., when the sequencer 109 encounters a macro call instruction during accessing of the emulation memory 102 in the supervisor mode, it sets the macro service flag 111. As a result, the macro service request signal 121 is supplied to the sequencer 109 to execute the macro service.

An operation which takes place when the sequencer 109 executes the user program in the emulation memory 102 in the non-supervisor (normal) mode will now be described.

Upon executing a return (RET) instruction in a supervisor interrupt routine, the sequencer 109 outputs the RETSVI signal 120 to reset the supervisor flag 110. As a result, the SVMOD signal 113 becomes logic "0", and the supervisor mode of the emulation chip 101 is cleared.

When the program in the emulation memory 102 is fetched, the sequencer 109 outputs the active (logic "1")

FETCH signal. As a result, the output of the composite gate 105 becomes logic "1" and the output of the inverter 108—i.e, the ALTR/W signal 119—becomes logic "0". Accordingly, the sequencer 109 fetches the instruction in the user program in the emulation memory 102.

When data is read from or written into the emulation memory 102, the sequencer 109 outputs the active (logic "1") NR/W signal 116. As a result, the output of the composite gate 105 becomes logic "1". Further, the output of the OR gate 107—i.e., the EMEMR/W signal 118—becomes logic "1", and the output of the inverter 108—i.e., the ALTR/W signal 119—becomes logic "0." Accordingly, the sequencer 109 reads data from or writes data into the emulation memory 103.

When the macro service request is generated, the sequencer 109 sets the macro service flag to logic "1". As a result, the sequencer executes the macro service. More specifically, the sequencer 109 outputs the active (logic "1") MSR/W signal 117, with the result that the output of the OR gate 107—i.e., the EMEMR/W signal 118—becomes logic "1". Accordingly, the sequencer 109 accesses the macro library stored in the emulation memory 102 to perform a macro development.

Figure 3:
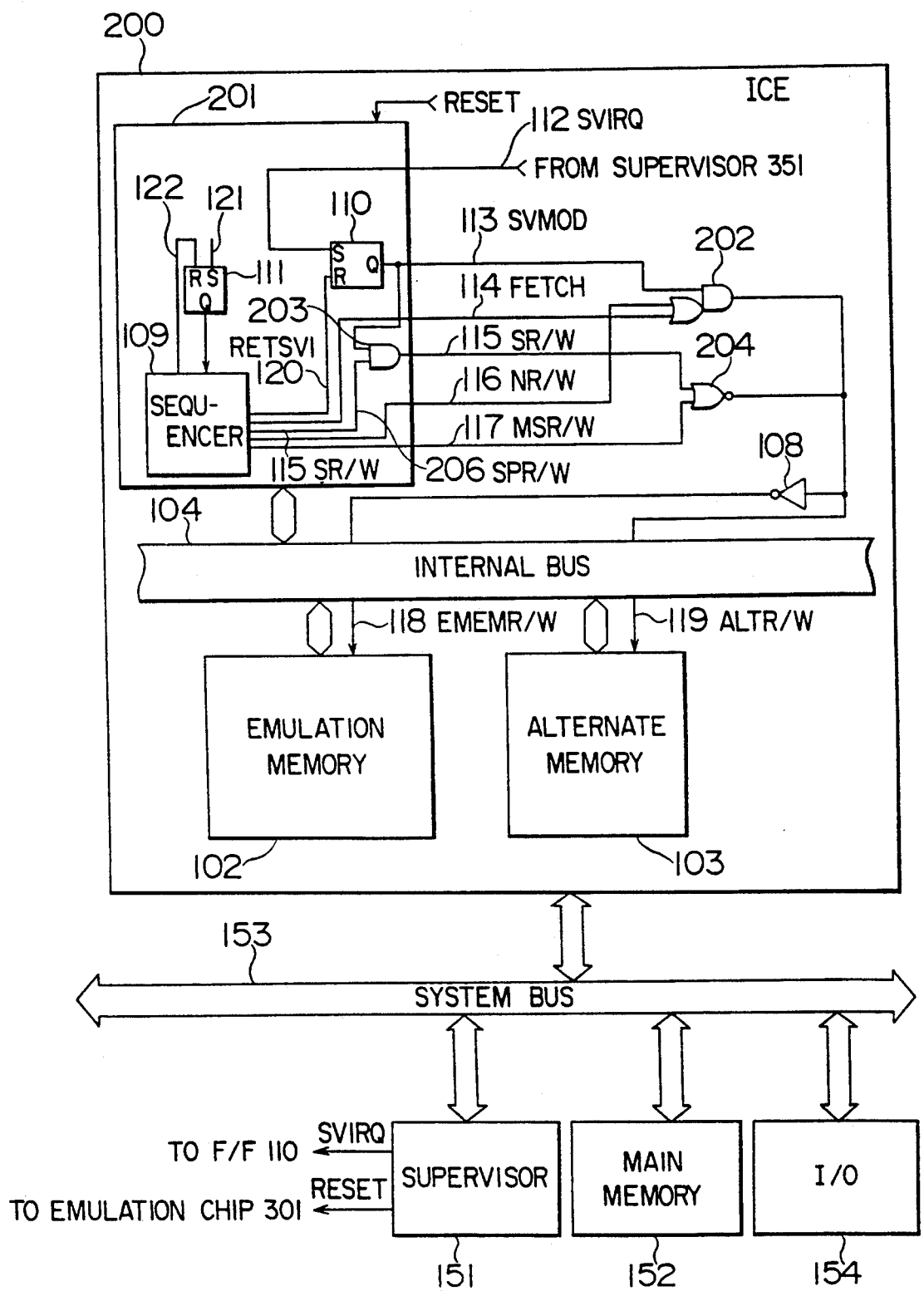
FIG. 3 is a block diagram showing another embodiment of the in circuit emulator according to the present invention.

Another embodiment of the in circuit emulator according to the present invention will now be described, with reference to FIG. 3. The same reference numerals denote the same parts as in the embodiment shown in FIG. 2, and thus description thereof will not be repeated.

The emulation chip 201 includes an AND gate 203 in addition to the construction of the emulation chip 101 shown in FIG. 2. The AND gate 203 outputs the SPR/W signal 206 output from the sequencer 109 as the SR/W signal 115 when the SVMOD signal 113 is at logic "1". More specifically, the embodiment shown in FIG. 3 is arranged such that the SR/W signal 115 from the sequencer 109 is output only in the supervisor mode. The SR/W signal 115 and the MSR/W signal 117 are gated by the NOR gate 204. As a result, generation of the read/write signal for the alternate memory 103 is controlled only by the composite gate 202. More specifically, when the instruction in the alternate memory 103 is fetched (when the FETCH signal 114 is at logic "1"), or when the data in the alternate memory 103 is accessed (when the NR/W signal 116 is at logic "1"), reading/writing from/into the alternate memory 103 is performed.

The arrangement as described above reduces the number of additional circuits required for the emulation chip 201. Lastly, it should be noted that in the embodiment, the macro service can be executed even in the supervisor mode, as in the first embodiment.

What is claimed is:

1. An In Circuit Emulator, comprising:
a first memory for storing a program to be executed by a target system;
a second memory for storing a program for controlling an emulation chip;
the emulation chip for emulating the target system, including:
a first latch for latching an externally supplied supervisor interrupt request signal;
a second latch for latching a macro service request; and
a sequencer for selectively accessing the first and second memories in response to the supervisor interrupt request signal and the macro service request to execute a corresponding program, the sequencer executing the macro service request independent of the supervisor interrupt request signal latched in the first latch;
gate means for outputting control signals for controlling access to the first and second memories; and
means for directly inputting to the sequencer, the macro service request latched in the second latch.

2. An In Circuit Emulator, comprising:
a first memory for storing a program to be executed by a target system;
a second memory for storing a program for controlling an emulation chip;
an emulation chip for emulating the target system, including:
a first latch for latching an externally supplied supervisor interrupt request signal;
a second latch for latching a macro service request; and
a sequencer for selectively accessing the first and second memories in response to the supervisor interrupt request signal and the macro service request to execute a corresponding program, the sequencer executing the macro service request independent of the supervisor interrupt request signal latched in the first latch;
a first gate for outputting a first access signal for the second memory when the supervisor interrupt request signal is latched by the first latch, and for outputting an access signal for the first memory when the supervisor interrupt request signal is not latched by the first latch; and
a second gate for outputting a second access signal for the first memory when the supervisor interrupt request signal is not latched by the first latch.

3. An In Circuit Emulator, comprising:
a first memory for storing a program to be executed by a target system;
a second memory for storing a program for controlling an emulation chip;
an emulation chip for emulating the target system, including:
a first latch for latching an externally supplied supervisor interrupt request signal;
a second latch for latching a macro service request; and
a sequencer for selectively accessing the first and second memories in response to the supervisor interrupt request signal and the macro service request to execute a corresponding program, the sequencer executing the macro service request independent of the supervisor interrupt request signal latched in the first latch;
a first gate for outputting a first access signal for the first memory only when the supervisor interrupt request signal is latched by the first latch;
a second gate for outputting a second access signal for the second memory when the supervisor interrupt request signal is latched by the first latch; and
a third gate for outputting a third access signal for the first memory when the supervisor interrupt request signal is not latched by the first latch.

* * * * *